PROCESS FOR FORMING ELECTRICAL CONDUCTORS ON INSULATING BASES

Filed May 20, 1957 3 Sheets-Sheet 1

INVENTOR.
Erwin E. Cado,
BY
Mueller & Aichele
Atty's.

INVENTOR.
Erwin E. Cado,
BY Norman L. Mueller
Atty.

July 3, 1962 E. E. CADO 3,042,591

PROCESS FOR FORMING ELECTRICAL CONDUCTORS ON INSULATING BASES

Filed May 20, 1957 3 Sheets-Sheet 3

INVENTOR.
Erwin E. Cado,
BY Mueller & Aichele
Atty's.

United States Patent Office 3,042,591
Patented July 3, 1962

3,042,591

PROCESS FOR FORMING ELECTRICAL CONDUCTORS ON INSULATING BASES

Erwin E. Cado, Chicago, Ill., assignor to Motorola, Inc., Chicago, Ill., a corporation of Illinois
Filed May 20, 1957, Ser. No. 660,420
7 Claims. (Cl. 204—15)

This invention relates to methods of forming electric conductors on insulating bases, and more particularly to methods for the deposition of electric conductors by electro-chemical action upon insulating bases, as well as to methods for forming such conductors involving other methods of deposition. This invention also relates to a circuit assembly as above referred to and of novel construction, which is particularly easy and convenient to handle during subsequent processing steps and in various applications, and which novel construction improves the strength of soldered connections thereto.

The present application is a continuation-in-part of copending application, Serial No. 317,447, filed October 29, 1952, now abandoned, entitled "Plating Process for Forming Electrical Conductors on Insulating Bases."

In forming an electric conductor upon an insulating base, it has been proposed to coat the base uniformly with a thin layer of electrically conductive material (such as silver), to mask those areas of the coated base on which no conductor is desired, electro-plate the unmasked areas with a second layer of a different conductive material (such as copper) to form the electric conductor, and thereafter remove both the masking material and the unplated underlying parts of the first conductive layer leaving only the desired conductor on the insulating base. Difficulties have been encountered in the prior art in affixing the metallic layers to the normally glossy surface of the insulating base with sufficient adhesion to produce a commercially acceptable product for electronic purposes. This has been overcome by roughening the normal glossy surface by sand blasting or other roughening means. The removal or roughening of the glossy surface, however, must be accomplished in a manner so that the base at the same time is not absorbent to moisture for that can produce undesired short circuits between the various conductors.

In application of an electro-plating resist on the unmasked areas, it has been common to employ a stencil. If the insulating panel has a pattern of holes therein, the stencil must register exactly with respect to this pattern to permit application of the resist material only to those portions of the surface which it is desired to mask and to prevent areas adjacent the holes from being undesirably masked. In commercial production, the obtaining of consistent, exact registry has often proved difficult.

Another difficulty often encountered in connection with printed or plated circuit assemblies arises in the soldering of electronic components to the circuit panels. It is often the practice to affix an electronic component to one side of a circuit panel by soldering its leads into holes in the insulating base. Although the bores of these holes are plated or otherwise coated with a conductive metallic layer, the solder nugget filling the hole can often be pulled therefrom by a relatively small amount of force applied to the lead in the hole or to the component itself.

It is an object of the present invention to provide an improved method of forming electric conductors on insulating bases so that they adhere to the base and yet the base is not rendered moisture-absorbing.

It is a further object of the invention to provide such an improved method of forming electric conductors on insulating bases which is simple in its nature and which produces a commercially acceptable product.

Another object of the invention is to provide a simple and reliable method of forming electric conductors on an insulating base which entails the use of cheap, common materials and inexpensive production techniques.

Another object of the invention is to provide a method of forming electric conductors on an insulating base having a pattern of holes or other patterns thereon wherein a material resistive to electro-plating or the like may be applied to surfaces of the insulating base which it is desired to mask without the necessity of providing for exact registry by a stencil or the like.

Another object of the invention is to provide a printed circuit panel carrying conductive patterns on both faces thereof, and having means forming holes therein with a configuration enhancing the strength of the solder bonds formed by soldering leads of electronic components or the like into said holes.

Still another object of the invention is the provision of a printed circuit assembly that may be handled with a minimum of danger of abrading or otherwise injuring the conductive pattern.

A feature of the invention is the formation of the previously discussed electric conductors only in grooves formed in the insulating base. The surfaces of the grooves are roughened to increase the adherence of the electric conductors, but there is no need to roughen or remove the glossy surface of the portions of the insulating base not carrying the conductors. The non-roughened portions of the base are not subject to moisture absorption, and shortcircuiting between the various conductors due to moisture absorption is avoided.

Another feature of the invention is the provision of an insulating base having a grooved surface corresponding to the conductive pattern to be formed thereon with the ungrooved portions of the surface constituting high relief areas so that a resist material may be easily applied to the high relief areas only by the use of a roller or a screen and squeegee combination, thus avoiding the use of a stencil which must be positioned in exact registry with the areas constituting the conductive pattern or with a pattern of holes in the panel.

Another feature of the invention is the provision of a printed circuit assembly having a grooved insulating panel and a predetermined pattern of holes in the insulating base, with the grooves surrounding at least some of the holes so that the bores of the holes are recessed from the surface of the circuit assembly thus providing annular shoulder means at the ends of the holes for locking solder nuggets therein.

Another feature of the invention is the formation of an insulating base with a grooved surface corresponding to the conductive pattern to be formed thereon with the surfaces of the grooves roughened to greatly improve their adherence to conductive metal so that when conductive metal is applied to the surface of the insulating base by solidification of a molten spray, it will adhere to the surfaces of the grooves thereby forming a conductive pattern of predetermined configuration. The ungrooved surface of the insulating base may be masked to provide for solidification of the metal only in the desired areas, but certain insulating materials adhere to metal selectively only on the roughened portions of their surfaces. When these materials are used, masking of the unroughened surfaces is unnecessary.

Still another feature of the invention is the provision of a printed circuit assembly wherein the conductive pattern is recessed somewhat from the surface of the insulating base so that the assembly may be more easily handled without danger of injuring the conductive pattern either during further processing steps, or in the attaching of components to the circuit, or in the incorporation of the panel into larger assemblies.

The foregoing and other objects and features of the invention will be better understood from a study of the following description when taken in conjunction with the accompanying drawings, in which:

FIGS. 1–6 are schematic representations of the insulating base in each of the various steps of one particular aspect of the improved processs of the invention;

FIG. 6*a* is a schematic representation of an insulating base having a hole therein and with a conductive pattern carried on each side thereof in the completed form;

In its broad aspect, the method of the present invention is the forming of an electrically conductive pattern on an insulating base including the steps of forming an insulating base having a grooved surface corresponding to the conductive pattern with the inside surfaces of the grooves conditioned to cause adhesion of the conductive metal thereto and solidifying a layer of conductive metal in the grooves.

In one of its embodiments, the method of this invention comprises the steps of (1) forming grooves in at least one surface of an insulating base in portions of that surface where a conductor is to be formed so that the result is a predetermined pattern for the grooves with intermediate high relief portions having the original surface of the base, (2) applying a first metallic coating over the high relief portions and in the aforesaid grooves, (3) applying a resist only over the high relief portions of the surface and not over the metal in the grooves, and (4) applying a second metallic coating over the exposed portions of the first metallic coating in the grooves and (5) removing the resist and the portions of the first metallic coating covered thereby so as to confine the metal coating to the grooves and provide an electric conductor thereon.

Figure 6:
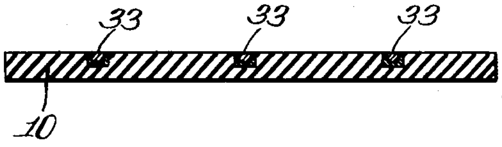
Figure 6A:
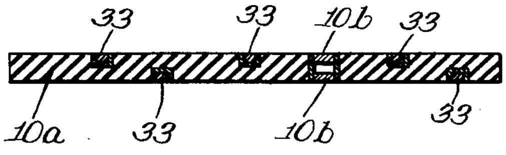

To simplify the discussion, the aspect of the process involving the deposition of conductors by electroplating will be explained as coating only one side of the base, however, it is to be understood that electric conductors in accordance with this aspect of the invention may be formed on both sides of the base in accordance with the process greatly to enlarge the commercial application of the complete product, FIG. 6*a* illustrates a typical panel having a hole therein with a metal conductor on the hole or bore, and with conductors formed on both of its surfaces.

Figure 1:
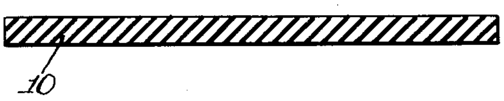
Figure 2:
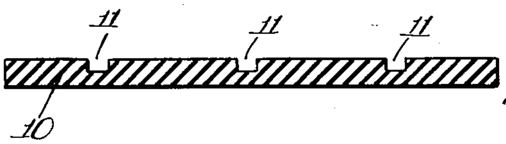
Figure 3:
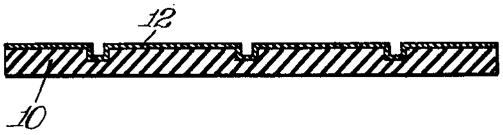

Referring now particularly to FIGS. 1–6, the insulating panel 10 of FIG. 1 may have a series of grooves 11 formed in its upper surface corresponding to the portions of that surface upon which an electric conductor is to be formed. The grooves 11 may be produced by chemical etching with nitric or other mineral acids, or cutting, or debossing in accordance with well-known techniques, or the grooves may be formed by molding during the fabrication of the panel. Various molding methods may be employed including injection molding, compression molding, transfer molding, and mechanical routing. The various techniques that may be utilized to impress or otherwise form grooves 11 on one or both surfaces of the panel 10 are believed to be well known so as to obviate the necessity of describing such a step in detail herein. For example, the required design may be etched on to a steel plate and the plate used for debossing the insulating panels or base.

The grooved surface of panel 10 is then coated by a metallic coating 12 which, for example, may be silver and which is formed over the entire surface and in the grooves. The coating 12 may be applied to the surface in a manner disclosed in United States Patent No. 2,699,425, which issued January 11, 1955, and which has been assigned to the assignee of the present application, and shown in FIG. 7 herein. The base is first rinsed by a water spray 15 from a nozzle 14, and then a sensitizing solution 16 (such as stannous chloride, $SnCl_2$) is then sprayed from a nozzle 17 onto the base. The base is then subjected to a dual spray from nozzles 20 and 21, one of these sprays being a silver salt solution 22, while the other spray is a salt reducing solution 23. The streams 22 and 23 unite with the chemical sensitizer at the surface of base 22 and the silver salt solution is reduced to metallic silver. The silver base 10 is washed by a water spray 24 from a nozzle 25 and is dried by an air blast 26 from a nozzle 27, producing a silver coating over the entire surface of the base and in the grooves. The grooves themselves may be roughened during the molding, etching, cutting, or debossing process to enhance the adhesion in the silver coating within the grooves and the surface of the base 10. This may be achieved by providing serrations on the debossing dies, or after grooving the base may be masked so that only the grooves are uncovered and subjected to a sand blast.

Figure 7:
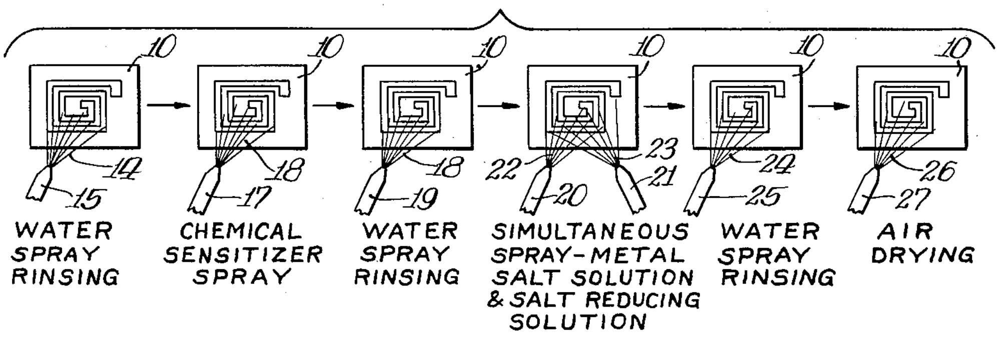
FIG. 7 is a series of schematic views showing various steps involved in practicing one aspect of the invention.

It is apparent that when it is desired to coat both sides of base 10 a pair of like nozzles may be disposed on opposite sides thereof to form the coating process of FIG. 7. The optimum thickness of silver on base 10 is that which produces a resistance of from 1 to 2 ohms as measured between prods 1 inch apart on an area which need not exceed 2 inches square. (Any greater area will not alter the resistance appreciably.) If the silver layer is thicker than this, it is not easily removable after the copper plating step. On the other hand, if the silver layer is too thin, it may not have sufficiently low resistance to carry the desired copper plating current.

Instead of depositing a silver coating on the base, it is also within the scope of the present invention to deposit other conductive metals, such as copper. This may be accomplished, for example, by the spraying of a cupric acetate solution and a sodium hydrosulphite solution onto the surface of the panel to effect reduction of the copper acetate thus producing a copper coating. Although in the subsequent description the coating layer 12 will be referred to as being of silver, it will be understood that it may also be of copper or of some other suitable conductive metal.

Figure 4:
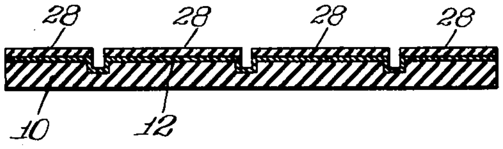
Figure 8:
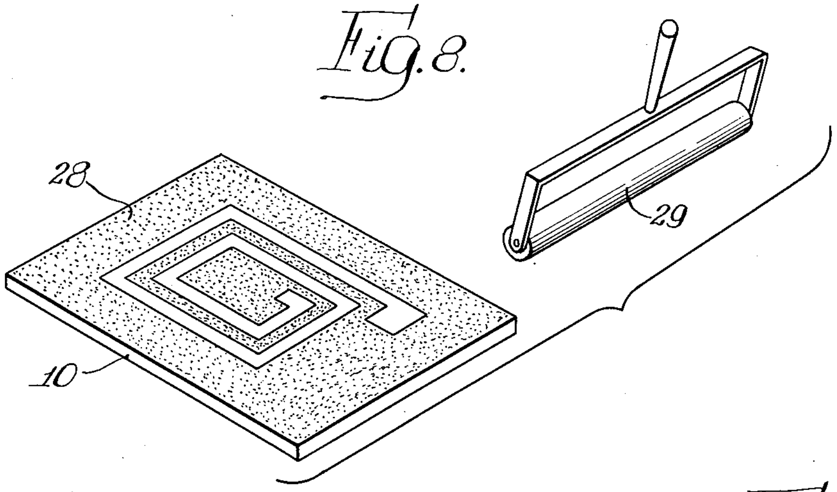
FIG. 8 is a simplified somewhat schematic view of equipment used for applying resist material to the base panel.

As shown in FIG. 4, a resist is applied over the high relief surfaces of coated base 10, the resist being indicated as 28. The resist may be applied in a manner shown in FIG. 8 by means of a suitable roller 29, which applies the resist only over the silver coating on the high relief surface. The resist is such that it does not run down over the silver coating lying within the aforementioned grooves.

Highly plasticized impregnated screening lacquer has been found to be highly satisfactory as a resist. This lacquer may be formed from commercial cellulose nitrate lacquer from which a substantial amount of solvent has been driven off by heating and which is mixed, for example, with butyl phthalate so as to be highly plasticized. Another resist that has proved to be highly satisfactory is an alkyd resin paste.

Figures 12, 13, 14, 15, 16, 17:
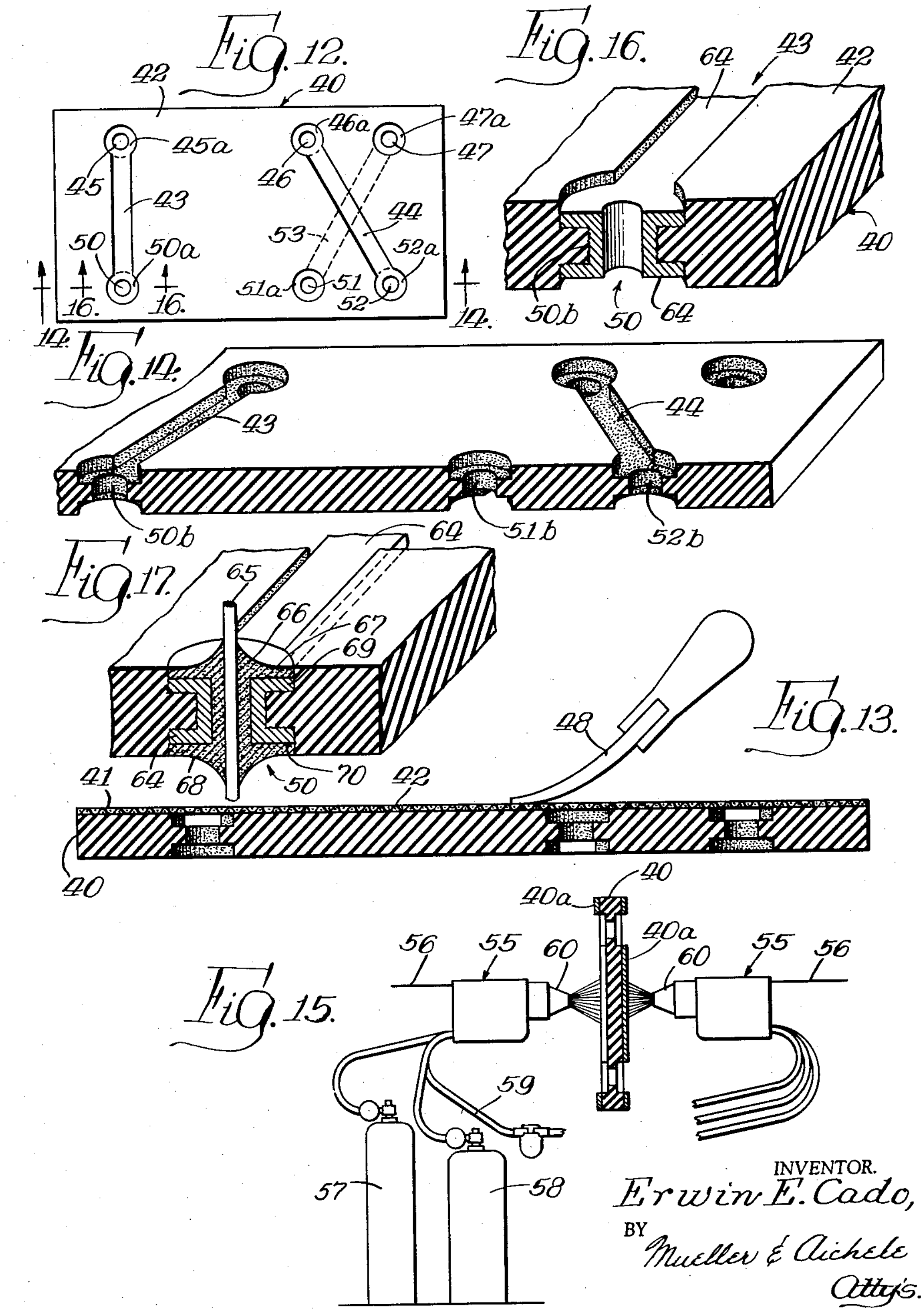
FIG. 12 is a plan view of an insulating base having a grooved pattern formed on both faces thereof.
FIG. 13 is a view in section taken on the line 14—14 of FIG. 12 and showing the application of a resist material to the surface of the insulating base by means of a screen and squeegee.
FIG. 14 is a perspective view in section taken on the line 14—14 of FIG. 12 showing the surfaces of the grooved pattern and the bores defining the holes in the base as being roughened.
FIG. 15 is a schematic view showing the application of a conductive metal to both surfaces of the insulating base shown in FIG. 12 in accordance with one particular aspect of the present invention.
FIG. 16 is a perspective view in section taken on the line 16—16 of FIG. 12 showing a layer of conductive metal in the bores of the hole and in the associated grooves.
FIG. 17 illustrates the view shown in FIG. 16 wherein a lead wire has been soldered into the hole.

FIG. 13 illustrates an alternative method of applying an electroplating resist to the high relief portions of an insulating base having a grooved pattern on its face. The insulating panel 40 which has grooves on both surfaces thereof as shown more fully in FIGS. 12, 14, 16 and 17 has a screen 41 laid over one surface thereof. The screen 41 is in contact only with the high relief areas, indicated generally at 42, whereas the grooves 43 and 44 are recessed as well as capping areas **45*a*, 46*a* and 47*a*, surrounding the holes 45, 46 and 47, respectively. These capping areas are extensions of the grooves associated with them and surround the holes in the insulating base. The resist lacquer is applied by means of the squeegee 48. Because the screen 42 is unsupported at portions directly above the capping areas, the holes and the grooves the resist passes through the screen only at portions directly above the high relief area 42**. Therefore, only the high relief areas are coated with the resist and the uncoated portions may be electro-plated. The grooves and the bores of the holes are coated with conductive metal to receive the electroplated layer.

The screen 42 is preferably of stainless steel but may be made of any other suitable metallic or non-metallic material. A 165 mesh screen has been found satisfactory in depositing resist selectively on the high relief areas of insulating panels having a normal groove depth of 0.01 inch or deeper. In applying particularly detailed resist patterns or in treating bases having more shallow grooves, use of a finer mesh screen may be desirable.

Figure 5:
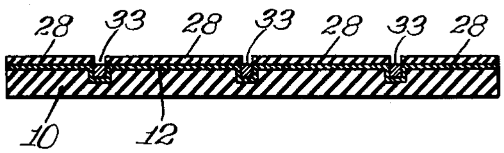
Figure 9:
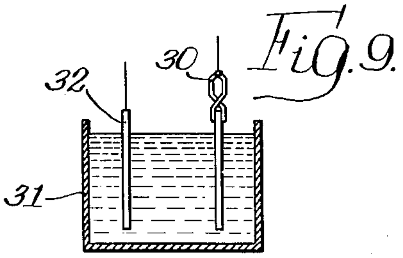
FIG. 9 represents the electro-plating steps in the process of the invention.

After being coated with the silver coating 12 and resist 28, base 10 is ready for copper plating. The article may first be wetted by a suitable wetting agent and suspended by a clip 30 (FIG. 9) in a copper electroplating bath 31. The silver coating 12 on base 10 forms one electrode, and another electrode 32 of copper is suspended in bath 31 as shown. The article is kept in the bath subject to electrolytic action for a sufficient length of time to build up the required thickness of copper 33 on the exposed silver areas within the grooves as shown in FIG. 5. The composition for the plating bath may be a standard solution such as 30–36 ounces of copper sulphate per gallon and 7–9 ounces of sulphuric acid per gallon and if brightening is required, half a gram of thiourea may be used for 20 gallons of the final solution.

Figure 11:
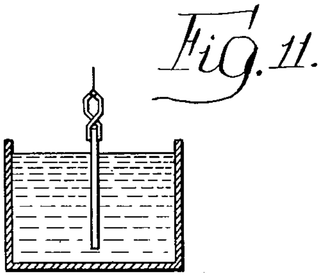
FIGS. 10 and 11 are schematic views representing alternate ways of removing the resist.
Figure 10:
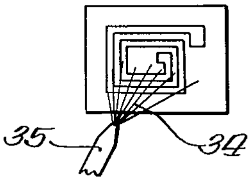

After being electroplated, the article is treated with a suitable solvent to remove the mask or resist 28. As shown in FIG. 10, a solvent spray 34 is directed from a nozzle 35 onto the work for this purpose. When lacquer is used for the resist, the article may be dipped, as shown in FIG. 11, in a caustic solution which rapidly dissolves the resist leaving a clean silver surface.

The next step is to remove the exposed silver, and this may be done by mechanically or manually brushing or rubbing the article with a brush or other instrument to remove the exposed silver from the high relief areas. Any particles of silver that might remain after the brushing operation may be removed by etching with nitric acid. Alternately, all the exposed silver from the high relief surfaces may be removed with etching with nitric acid, but care must be taken that the acid does not attack the copper conductors. Moreover, as disclosed and claimed in the aforementioned U.S. Patent 2,699,425, the exposed silver may be removed by subjecting it to the action of a conversion agent which renders the silver electrically non-conductive and soluble in a cleaning agent. For example, sodium hypochlorite NaOCl, may be used as a converter, or sodium thiosulfate $Na_2S_2O_3$, or ammonium hydroxide $NH_4OH$, may be used as cleaning agents.

FIG. 6*a* is a view in section of an insulating panel **10*a* which is the same as the panel 10 shown in FIG. 6 except it has conductors on both sides thereof and has a hole 10*b* therein. The bore of the hole 10*b*** is plated with copper just as the grooves are. The conductive patterns are formed in exactly the same way described in connection with formation of conductors on only one surface.

In illustrating the invention, a relatively simple conductor pattern has been shown. It is obvious, of course, that the principles of this embodiment of the invention can be applied to any complex design. Isolated conductors can be formed in the same insulating base in a single operation. As will be explained more fully in connection with the description of the other aspects of the invention, conductors may be formed on both sides of the base and holes provided from grooves on one side to grooves on the other side with copper or other conductive metal plating extending therethrough interconnecting such conductors.

The method of the present invention may utilize other methods for depositing electrical conductors besides the method heretofore described. Another method involving the solidification of conductive metal onto a surface that has previously been conditioned to receive it is flame spraying of molten metal into the grooves of an insulating panel. It has been found that the roughening of the surfaces of the grooves in the insulating bases greatly improves adhesion of metals deposited therein by condensation of molten metal. In some instances, it may be desirable to enhance the adhesion of the surfaces of the grooves by application of a suitable adhesive thereto.

FIG. 12 is a plan view of a typical insulating base having holes 45, 46, 47, 50 and 52 therein. The panel has had grooves 43 and 44 formed in one face thereof and groove 53 formed in the opposite face. The grooves are extended to surround the holes associated with them and form recessed capping areas **45*a*, 46*a*, 47*a*, 50*a*, 51*a*, and 52*a*** around the holes. The ends of the holes are thus countersunk from the high relief areas of the insulating base. As previously stated, the grooves and the holes may be formed by treatment of a flat insulating board as by etching, cutting, debossing, or the like, or in the case of a molded panel, they may be formed during the fabrication of the panel itself. In normal commercial operations, the depth of the grooves will be about 0.01 inch or somewhat deeper.

As shown in FIG. 14, the inner surfaces of the grooves 43 and 44 including the associated capping areas and the bores of the holes such as **50*b*, 51*b* and 52*b*, have their surfaces substantially roughened with respect to the high relief area 42**. This roughening may be accomplished by a suitable sandblasting operation, by a debossing operation, or by providing suitably roughened dies in instances where the insulating panels are formed by molding an unpolymerized resin.

When insulating panels such as 40 have been prepared with their roughened grooved surfaces which are thus conditioned for improved adhesion of deposited metals, a conductive pattern may be applied within the grooves and inside the bores of the holes. FIG. 15 illustrates schematically the application of conductive metal to the insulating panel 40 by means of flame spraying. According to this method, a suitable masking material is applied to the high relief areas on which no conductive layer is desired and a spray of atomized, molten conductive metal such as copper, zinc, or aluminum is directed against the masked, grooved insulating panel. The molten metal solidifies in the grooves and on the masking material, the latter being subsequently removed to leave a conductive pattern within the grooves. The roughening of the surfaces of the grooves provides for good adhesion of the solidified metal to the insulating base. In certain instances, it may be desirable to augment the adhesion between the solidfied metal and the base by application of a suitable adhesive to the roughened surfaces.

A suitable method of applying atomized molten conductive metal to an insulating panel is by means of the metallizing guns 55, a pair of which are shown in FIG. 15 applying metal simultaneously to both sides of the insulating panel 40 to which a masking material, indicated at 40*a*, has been applied on the high relief areas 42 only. The metal to be sprayed is fed into the gun 55, preferably in the form of wire 56 and is melted by the heat of acetylene from tank 57 being burned by oxygen from tank 58. Compressed air from line 59 atomizes the liquid metal and ejects it in the form of fine droplets from nozzle 60.

The metal solidifies within the grooves on the bores of the holes and on the masking material 40*a*. The coated mask is then removed leaving the desired conductive pattern in the grooves and in the bores of the holes.

The masking material 40*a* may take the form of a metal or plastic screen or a suitable wax-like material may be applied to the high relief areas 42 by the rolling or screen and squeegee techniques previously described. After deposition of the metal in the grooves, this grease may easily be removed from the insulating base by stripping with steam.

Although copper is a preferred conductive metal from flame metallizing as described above, very good results have been obtained with zinc. It is believed that this is due to the fact that zinc, though not as good a conductor as copper, is somewhat easier to liquify so that a somewhat heavier conductive layer may be built up with the zinc than in the case of copper. Various alloys may also be deposited in this manner by feeding alloy powder into the gun.

In a typical application using a phenolic laminate for the insulating base 40 and employing copper as the conductive metal, the guns 55 are maintained at a distance of between 8 and 10 inches from the surface to be treated. The base is covered on its high relief areas with the masking grease identified above. The oxygen is applied under a pressure of about 24 pounds per square inch, the acetylene under a pressure of 14 pounds per square inch, and the air under a pressure of 70 pounds per square inch. Under these conditions, a layer of conductive copper up to a thickness of 0.01 inch in thickness may be deposited upon the roughened grooved surfaces in the roughened bores of the holes. Upon removal of the metal coated masking material, a circuit panel having a conductive copper pattern remains with the copper being firmly attached to the insulating panel 40.

It has been found that certain insulating materials are of such a nature that their smooth, relatively glossy surfaces will not adhere to flame sprayed conductive metal while their roughened surfaces will accept the metal and form a secure bond thereto. When such materials are used as the base material, molten metal may be sprayed directly against an unmasked grooved surface wherein the surfaces of the groove and the pores of the holes are roughened relative to the relief areas and the metal will adhere selectively to such roughened surfaces. In this way, the desired conductive pattern is formed directly without the necessity of masking.

Insulating materials that have been found to exhibit the property of selective adherence to metals on their roughened surface include phenolic, polyester and epoxy plastics that contain a fibrous filler. For example, phenolic laminate containing a paper filler have been found suitable for application of sprayed molten copper in the manner described in the preceding paragraph. Glass-filled epoxy resin compositions and paper-filled polyester compositions are also useful in practicing this embodiment of the invention.

FIGS. 16 and 17 illustrate the advantages obtained by employing certain aspects of the present invention particularly the use of counter-sunk holes in the insulating panel obtained by a depressed capping area surrounding the bores forming the holes, this capping area being an extension of the grooved surface of the insulating base.

FIG. 14 shows a view in cross-section and perspective of the insulating panel 40 at the hole 50 after a conductive metal layer has been deposited within the groove 43 on the surfaces thereof and on the bores 50*b* of the hole 50. It will be understood that in the process of the present invention the other holes of the panel 40 as well as the other grooves are all similarly treated.

The metallic layer 64 may be formed in accordance with any of the methods heretofore described and may be of any suitable metal or may be made up of a plurality of layers of conductive metals.

In accordance with a preferred embodiment of the invention, the conductive layer 64 is shown as being somewhat recessed from the high relief area 42 of the insulating base 40. Because the conductive pattern is so recessed, it is less subject to injury by abrasion or otherwise than if it extended above the high relief area 42. In the various applications of printed circuit panels, there is often danger of breaking the conductive pattern as by inadvertently running a screw driver or other sharp instrument across the face of the panel. Where the conductive pattern is depressed from the surface of the panel in accordance with the present invention, there is obviously much less danger of injury to the circuit taking place due to accidents of this type. Circuits may also be more easily and safely handled in storage and shipping since there is a greatly diminished chance of their being injured by rubbing against one another. Such damage often occurs where the conductive pattern is built up above the surface of the insulating panel.

FIG. 17 shows the application of solder to a hole of the type particularly illustrated in FIG. 16. The lead wire 65 is held within the hole 50 by means of the solder nugget 66 which fills the hole 50 as well as the capping areas 50*a* on both surfaces of the insulating base 40. The lead 65 is attached to a component (not shown) which is held to one surface of the insulating panel. The solder nugget 66 assumes the shape shown in FIG. 17 with the annular lip portions 67 and 68 filling the capping areas at either end of the hole. When tension is applied to the lead 65 in a direction normal to the surface of the insulating base 40, the annular lips 67 and 68 tend to lock the solder nuggets 66 in place by bearing against the annular shoulders 69 and 70, respectively, at the bottom of the respective capping areas at either end of the hole. This arrangement provides superior holding action than could be maintained in the absence of the annular shoulders 69 and 70 in which case positioning of the solder nugget would be dependent entirely upon its adhesion to the metal in the bores of the holes. Although the bores of the holes and the bottoms of the capping areas are shown as forming substantially right angles with one another, it is within the scope of the present invention to provide inclined surfaces at the bottoms of the capping areas which are not parallel with the surface of the insulating base but which slope toward the ends of the holes to provide annular shoulders at both ends of the holes against which the lips of the solder nuggets are held.

In accordance with the present invention, a printed circuit assembly is formed by the solidification of a conductive metal in the grooves formed on the surfaces of an insulating base. By conditioning the surfaces of these grooves, as by roughening, a high degree of adhesion between the conducting layer and the base may be obtained while at the same time producing a conductive pattern which may be somewhat recessed from the surface of the insulating base and thus protected against abrasion and other injury. By extending the grooved pattern to provide for recessed capping areas around holes in the panel it is possible to lock in a solder nugget used to affix a lead wire or the like within the hole. By providing an insulating panel having a grooved pattern corresponding to the conductive pattern, it is possible to apply an electro-chemical or other type resist over the high relief areas only of the insulating base without the necessity of using a stencil and obtaining exact registry. This application may be made either by rolling on the resist or by applying it through a screen. This is of definite advantage in instances where the conductive metal is to be applied to the insulating base by an electro-plating process or by spraying with molten metal.

I claim:

1. A method of forming an electrically conductive pattern carried on an insulating base including the steps of forming an insulating base having a grooved surface corresponding to the conductive pattern, the ungrooved portion of said base constituting high relief areas, applying a first metallic coating over the high relief areas of said base and in the grooves, applying a resist over only the portions of first metallic coating on the high relief areas, applying a second metallic coating to said base over the exposed portions of said first metallic coating in said grooves, and removing said resist and the portions of said first metallic coating covered by said resist.

2. A method of forming an electric conductor upon an insulating base which comprises the following steps, forming grooves in at least one surface of said base in portions thereof where a conductor is to be formed, the ungrooved surface of said base constituting high relief areas, applying a first metallic coating over said high relief areas of said base and in the aforesaid grooves, applying a resist over the portions of metallic coating on the high relief areas only of said surface of said base, applying a second metallic coating to said base over the exposed portions of said first metallic coating in said grooves, and removing said resist and the portions of said first metallic coating covered by said resist.

3. A method of forming an electric conductor upon an insulating base which comprises the following steps, providing an insulating base with grooves in at least one surface of said base in portions thereof where a conductor is to be formed, the ungrooved surface of said base constituting high relief areas, applying a first metallic coating over the high relief areas of said base and in the aforesaid grooves, rolling a resist over the portions of metallic coating on the high relief areas only of said surface of said base, applying a second metallic coating over the exposed portions of said first metallic coating in said grooves, and removing said resist and the portions of said first metallic coating covered by said resist.

4. A method of forming an electric conductor upon a molded insulating base having grooves in at least one surface thereof corresponding to the portions of such surface upon which a conductor is to be formed, the ungrooved surface of said base constituting high relief areas, said method comprising the following steps, applying a metallic coating over the aforesaid high relief areas of said base and in the aforesaid grooves, applying a resist over the portions of the metallic coating on the high relief areas only of said surface of said base, applying a second metallic coating to said base over the exposed portions of said first metallic coating in said grooves, and removing said resist and the portions of said first metallic coating covered by said resist.

5. A method of forming an electrically conductive pattern upon an insulating base which includes the steps of forming an insulating base having a grooved surface corresponding to the conductive pattern, the ungrooved portions of said base constituting high relief areas, applying a first metallic coating over the high relief areas of said base and in the grooves, applying a resist through an unpatterned screen over the high relief areas only of said surface of said base, applying a second metallic coating to said base over the exposed portions of said first metallic coating in said grooves and removing said resist and portions of said first metallic coating covered by said resist.

6. A method of forming an electric conductor design upon at least one surface of an insulating panel which comprises the following steps, forming the desired conductor design in relief on a surface of a debossing plate, roughening the high relief portions of said surface of the debossing plate, impressing said debossing plate onto a surface of the insulating panel to form grooves therein corresponding to the desired conductor design with the surfaces of the grooves being roughened by the roughened portions of said debossing plate, applying a first metallic coating over said high relief portions of said insulating panel and in the grooves formed therein by said debossing plate, applying a resist over the portions of the metallic coating on the high relief portions only of said surface of said plate, applying a second metallic coating to said metallic coating to said panel over the exposed portions of said metallic coating in said grooves, and removing said resist and the portions of the first metallic coating covered thereby.

7. The method of producing a printed pattern of conductive material on a permanent insulating base, said method comprising the steps of: molding the surface of the insulating base to provide recessed and non-recessed surfaces in accordance with the printed pattern desired; applying to the surface of said base, including the recessed and nonrecessed surfaces thereof, a film of conductive material; contacting the surface of said base with an applicator carrying a continuously distributed coating of masking material whereby masking material contacts and is transferred only to the non-recessed surfaces of said base leaving the conductive film exposed at the recessed surfaces thereof; electroplating a coating of conductive material on the exposed conductive film at the recessed surfaces of said base; and removing said masking material and the portions of conductive film underlying the masking material at the non-recessed surfaces of said base.

References Cited in the file of this patent

UNITED STATES PATENTS

| | | |
|---|---|---|
| 717,778 | Spaulding | Jan. 6, 1903 |
| 1,559,380 | Roe | Oct. 27, 1925 |
| 2,427,144 | Jansen | Sept. 9, 1947 |
| 2,599,710 | Hathaway | June 10, 1952 |
| 2,682,501 | Teal | June 29, 1954 |
| 2,699,424 | Nieter | Jan. 11, 1955 |
| 2,748,023 | Meth | May 29, 1956 |
| 2,758,074 | Black et al. | Aug. 7, 1956 |
| 2,770,558 | Gaiser | Nov. 13, 1956 |
| 2,778,867 | Janssen | Jan. 22, 1957 |
| 2,783,193 | Nieter | Feb. 26, 1957 |
| 2,848,359 | Talmey | Aug. 19, 1958 |
| 2,886,475 | McKay | May 12, 1959 |